United States Patent
Fink, Jr. et al.

[15] 3,657,621
[45] Apr. 18, 1972

[54] SPEED RESPONSIVE MOTOR STARTING SYSTEM

[72] Inventors: Leon Fink, Jr., Arlington; David C. Fricker, Hurst, both of Tex.

[73] Assignee: ECC Corporation, Euless, Tex.

[22] Filed: Mar. 12, 1971

[21] Appl. No.: 123,735

[52] U.S. Cl. ..................................318/221 E, 318/227
[51] Int. Cl. ..................................................H02p 1/44
[58] Field of Search ............318/220 R, 221 R, 221 E, 227, 318/474, 476

[56] References Cited

UNITED STATES PATENTS

| | | | |
|---|---|---|---|
| 3,376,484 | 4/1968 | Lewus | 318/221 E |
| 3,414,789 | 12/1968 | Prouty | 318/221 E |
| 3,544,869 | 12/1970 | Plouffe et al. | 318/221 R |

*Primary Examiner*—Gene Z. Rubinson
*Attorney*—Giles C. Clegg, Jr., Richard E. Bee and Jack A. Kanz

[57] ABSTRACT

A semiconductor switching circuit responsive to the speed of a single phase induction motor for controlling the starting operation thereof. A power bilateral semiconductor switching device is connected in series with the motor starting reactance for controlling current flow therethrough. A logic bilateral semiconductor switching device is coupled to the gate electrode of the power device for enabling and disabling the operation thereof. A current sensing transformer is coupled in circuit with the motor run winding for controlling the logic switching device in accordance with the motor speed. A capacitor is connected in series in the gate electrode circuit for the power switching device for advancing the phase angle of the gating current supplied thereto.

10 Claims, 2 Drawing Figures

PATENTED APR 18 1972 3,657,621

LEON FINK, JR.
DAVID C. FRICKER
INVENTORS

ATTORNEYS

SPEED RESPONSIVE MOTOR STARTING SYSTEM

BACKGROUND OF THE INVENTION

This invention relates to solid state or semiconductor motor starting circuits and, more particularly, to semiconductor motor starting circuits especially adapted for use in the starting of single phase induction motors.

Various semiconductor motor starting circuits have been heretofore proposed. In a typical such circuit, a bilateral semiconductor switching device is connected in series with the starting reactance of the motor and a current sensing resistor is connected in series with the run winding of the motor. The current sensing resistor is connected to the gate electrode of the semiconductor switching device for controlling same for enabling line current to flow through the starting reactance when the motor speed is below a prescribed minimum value.

Circuits of this proposed type suffer from various disadvantages. For one thing, the alternating-current voltage appearing across the current sensing resistor will usually be lagging in phase relative to the alternating current flowing through the starting reactance and switching device. As a result, the switching device will not immediately commence conduction at the beginning of each half cycle of the starting reactance current. Instead, there will be a time lag caused by the lag in triggering of the switching device. Consequently, the current flow through the starting reactance will have a waveform characterized by a zero level notch immediately following the beginning of each half cycle. The presence of such notches results in a decrease in the effective power supplied to the starting reactance, thus reducing the starting torque applied to the motor.

Another disadvantage of motor starting circuits of the foregoing type is that they are sensitive to variations in the value of the alternating-current line voltage. In particular, variations in the line voltage produce corresponding variations in the time lag in the triggering of the switching device. The resulting effect on the motor starting torque limits the range of line voltage values over which the motor may be reliably used.

It is an object of the invention, therefore, to provide a new and improved speed responsive motor starting system which enables a fuller realization of the maximum starting torque capability of the motor.

It is another object of the invention to provide a new and improved speed responsive motor starting system which has a greater tolerance for variations in the value of the alternating-current line voltage.

For a better understanding of the present invention, together with other and further objects and features thereof, reference is had to the following description taken in connection with the accompanying drawing, the scope of the invention being pointed out in the appended claims.

BRIEF DESCRIPTION OF THE DRAWING

Referring to the drawing.

DESCRIPTION OF THE ILLUSTRATED EMBODIMENT

Figure 1:
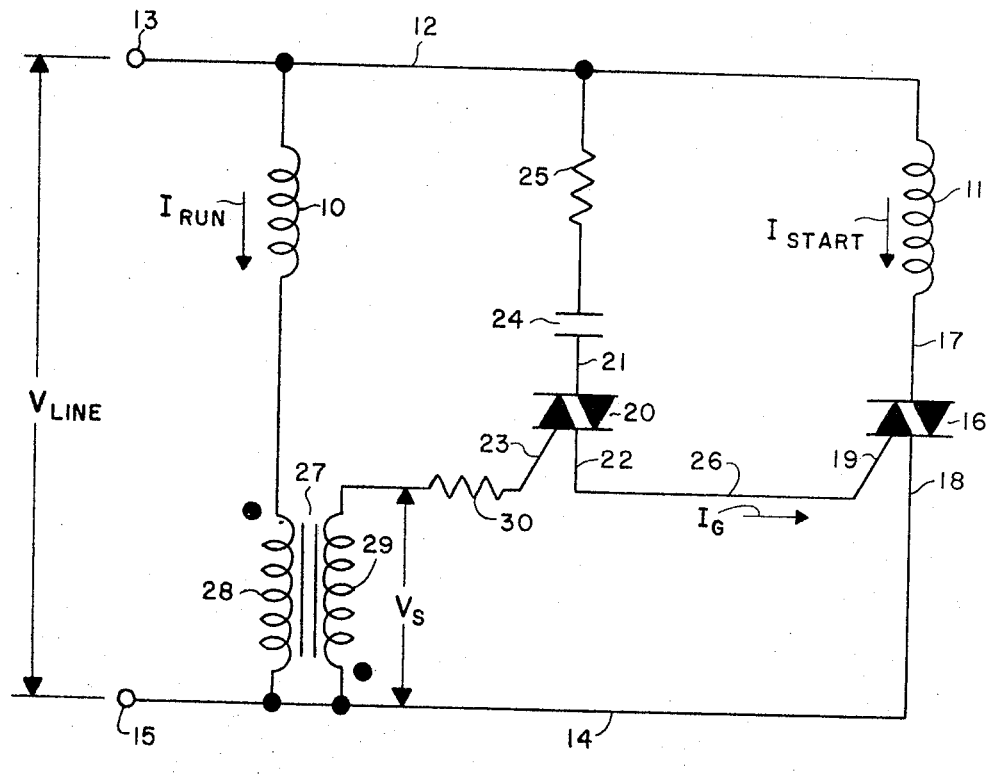
FIG. 1 is a schematic circuit diagram of a motor starting system constructed in accordance with the present invention.

Referring to FIG. 1, there is shown the major electrical parts of a single-phase alternating-current induction motor, such parts including a run winding 10 and a start mechanism represented by a start winding 11. Run winding 10 and start winding 11 are located in parallel circuit branches which are connected between a pair of supply circuit means adapted to be individually connected to different sides of an electrical power source. A first of these supply circuit means includes a power supply conductor 12 having a power supply terminal 13 at one end thereof. The second of these supply circuit means includes a second power supply conductor 14 having a power supply terminal 15 at one end thereof. In use, terminals 13 and 15 are connected to different sides of an electrical power source such as, for example, a two-wire alternating-current power line. The starting reactance (represented by start winding 11) need not be purely an inductance but may instead take various other forms as are well known in the induction motor art.

Connected in series with the start winding 11 is a first gate controlled bilateral semi-conductor switching device 16 having a pair of power electrodes 17 and 18 and a control or gate electrode 19. For sake of convenience, the power electrode 18 located on the same side of the device 16 as the gate electrode 19 will be referred to as the cathode, while the other power electrode 17 will be referred to as the anode. Also, the device 16 will sometimes be referred to as the "power" switching device. The switching device 16 is connected in series with the start mechanism 11 by means of its power electrodes 17 and 18, the anode 17 being connected to the start mechanism 11 and the cathode 18 being connected to the lower power supply conductor 14.

The operation of the power switching device 16 is controlled by a second gate controlled bilateral semiconductor switching device 20 having a pair of power electrodes 21 and 22 and a control element represented by a control electrode or gate electrode 23. For sake of convenience, the power electrode 22 located on the same side of the device 20 as the gate electrode 23 will be referred to as the cathode, while the other power electrode 21 will be referred to as the anode. Also, the device 20 will sometimes be referred to as the "logic" switching device. This second switching device 20 is connected to supply gating current to the gate electrode 19 of the power switching device 16. More particularly, the anode 21 is connected by way of a capacitor 24 and a resistor 25 to the upper power supply conductor 12, while the cathode 22 is connected directly to the gate electrode 19 of the power switching device 16 by means of conductor 26.

Operation of the logic switching device 20 is controlled by current sensing means represented by a current transformer 27. Current transformer 27 includes a first or primary winding 28 connected in series with the motor run winding 10 and a second or output winding 29 coupled to the gate electrode 23 of the logic switching device 20. The upper end of the secondary or output winding 29 is connected to the gate electrode 23 by way of a current limiting and trimming resistor 30, while the lower end of winding 29 is connected to the lower power supply conductor 14. As indicated by the dots on the windings of the transformer 27, the output winding 29 is coupled to the gate electrode 23 in an opposite polarity manner relative to the primary winding 28 such that an additional 180° phase shift is added to the gating current supplied to the gate electrode 23. In other words, when the upper end of the primary winding 28 is positive, the upper end of the secondary winding 29 is negative and vice versa. Transformer 27 is constructed so that the impedance of the primary winding 28 is very, very small.

Figure 2:
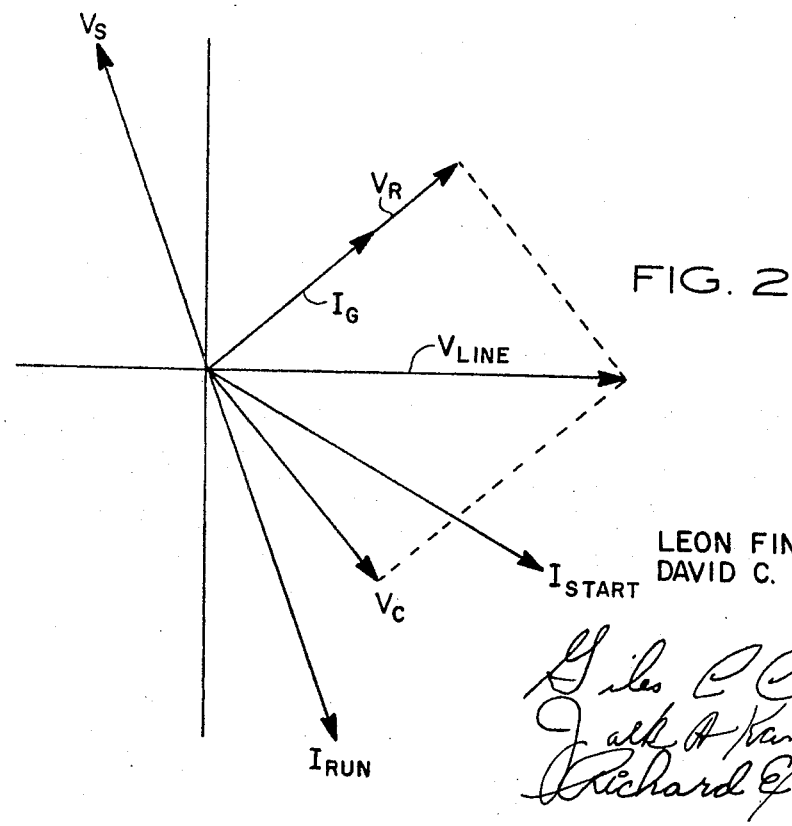
FIG. 2 is a vector diagram used in explaining the operation of the FIG. 1 system.

Considering now the operation of the FIG. 1 embodiment, the magnitude of the current $I_{run}$ flowing through the motor run winding 10 varies inversely with the speed of rotation of the motor. When the rotor of the motor is stationary, the current flow is fairly heavy. As the motor picks up speed, the current flow decreases. Because of the inductive nature of the run winding 10, the current $I_{run}$ lags the line voltage $V_{line}$ applied between the power supply conductors 12 and 14. A typical phase relationship for these quantities is indicated in the vector diagram of FIG. 2. Current transformer 27 acts to sense the magnitude of the current flowing through the run winding 10 and to develop across the secondary or output winding 29 thereof an alternating-current voltage $V_s$ which is proportional in magnitude to the magnitude of the run winding current $I_{run}$. The secondary voltage produces the gating current for the gate electrode 23 of the logic switching device 20. Because of the opposite polarity connection of the secondary winding 29, the voltage $V_s$ and, hence, the gating current to the logic device 20 is shifted in phase by a factor of 180° with respect to the run winding current flowing through the transformer primary winding 28. Thus, for the example depicted in FIG. 2, if the run winding current lags the line voltage by 70°, then the secondary voltage $V_s$ leads the line voltage by a factor of 110°.

When the gating current supplied to the gate electrode 23 exceeds a predetermined trigger level set by the internal characteristics of the logic device 20, the logic device 20 is conditioned to conduct current from one power electrode to the other whenever the voltage across the power electrodes exceeds a certain minimum value. Such power electrode current may flow from the anode 21 to the cathode 22 or vice versa, depending on the polarity of the line voltage at the moment considered. When in a conductive condition, the impedance between power electrodes 21 and 22 is of a very low value. When in a nonconductive condition, the impedance between the power electrodes 21 and 22 is relatively high. The device 20 will switch to the conductive mode for either positive or negative polarity gating current at the gate electrode 23, provided the amplitude of such current is above the trigger level.

Assuming for the moment that the motor has just been turned on and that the rotor is still stationary, then both the run winding current and the secondary voltage $V_s$ are relatively large and the switching device 20 is rendered conductive at some point during each half cycle of the secondary voltage $V_s$. With the device 20 conductive, current flows from the upper power supply conductor 12, through the resistor 25, the capacitor 24, the switching device 20 and the gate electrode 19 to cathode 18 portion of the power switching device 16, or vice versa. This current $I_g$ is the gating current for the power device 16 and is of sufficient magnitude to render the power device 16 conductive at some point during each half cycle. The use of the capacitor 24 in this circuit causes the gating current $I_g$ to lead the line voltage by some factor such as, for example, 40°. This results from the fact that the voltage drop across the capacitor 24, namely $V_c$, lags the line voltage, hence causing the voltage drops across the resistive elements in the circuit to lead the line voltage in order that the vector sum of such capacitive and resistive drops may add up to the value of the line voltage, both in amplitude and phase. Since the gating current $I_g$ is in phase with the resistive drops, such gating current leads the line voltage.

The operation of the logic switching device 20 is such that it turns off each time the current $I_g$ flowing between its power electrodes 21 and 22 crosses the zero amplitude axis. Since the secondary voltage $V_s$ supplied to the gate electrode 23 leads the current $I_g$ flowing between the power electrodes 21 and 22, the device 20 will have a relatively high value of gate electrode drive current at the moment of occurrence of the zero axis crossing of the power electrode current $I_g$. Consequently, the logic device 20 will turn on again at practically the same moment that the current $I_g$ crosses the zero axis. Thus, provided the secondary voltage $V_s$ is above the trigger level, the device 20 will be conductive practically the entire time.

The flow of gating current $I_g$ serves to render the power switching device 16 conductive. The power device 16 works in the same manner as the logic device 20. Thus, since the gating current $I_g$ leads the current $I_{start}$ flowing through the start winding 11, the power device 16 has relatively high values of gating current $I_g$ at its gate electrode 19 at the same moments that the start current $I_{start}$ makes its zero axis crossings. Consequently, the power device 16 is turned on again practically as quick as it is turned off by such zero axis crossings. Thus, the power device 16 is conductive very nearly 100 per cent of the time. This substantially eliminates the undesired notch effect in the start winging current, thus allowing the motor to more nearly realize its maximum starting torque capability.

So long as the run winding current exceeds a threshold value corresponding to the trigger level for the logic device 20, both of the switching devices 16 and 20 remain operative. When the motor reaches the desired minimum operating speed, the run winding current falls below this threshold value. This causes the secondary voltage $V_s$ to fall below the trigger level for the logic device 20 which, in turn, renders the logic device 20 inoperative. The resulting high impedance between the power electrodes 21 and 22 reduces the current $I_g$ to a negligible value which, in turn, renders the power switching device 16 inoperative. The resulting high impedance between power electrodes 17 and 18 reduces the current flow through the start winding 11 to a neglibile value and thus, in effect, disconnects or disables the start winding 11. After this point is reached, the torque for driving the motor is provided entirely by the run winding 10.

In addition to substantially eliminating the undesired notch effect in the start winding current, it has been found that the FIG. 1 embodiment also has a tolerance for relatively wide variations in the magnitude of the alternating-current line voltage applied to the power supply terminals 13 and 15. This enables the motor to be used satisfactorily under fairly adverse line voltage conditions. Also, because of the very low primary impedance of the current sensing transformer 27, the power dissipation in the primary winding 28 is very small.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A speed responsive motor starting system comprising:
   a motor including a run winding and a start mechanism;
   a first and bilateral switching device having a pair of power electrodes and a control electrode;
   a second switching device having a pair of power electrodes and a control element;
   first circuit means connecting the first switching device by its power electrodes in series with the motor start mechanism;
   second circuit means connecting the second switching device by its power electrodes to supply gating current to the control electrode of the first switching device;
   current sensing means responsive to the current flowing through the run winding for supplying gating current to the control element of the second switching device;
   and capacitor means connected in series in the second circuit means for advancing the phase angle of the gating current supplied to the control electrode of the first switching device for minimizing the notch effect in the current flowing through the start mechanism.

2. A speed responsive motor starting system in accordance with claim 1 wherein the second switching device is also a bilateral switching device and its control element is a control electrode.

3. A speed responsive motor starting system in accordance with claim 2 wherein both the first and the second switching devices are gate controlled bilateral semiconductor devices.

4. A speed responsive motor starting system in accordance with claim 2 wherein the current sensing means comprises transformer means responsive to current flowing through the motor run winding and having an output winding for supplying gating current to the control electrode of the second switching device.

5. A speed responsive motor starting system in accordance with claim 4 wherein the output winding of the transformer means is coupled to the control electrode of the second switching device with a polarity such that an additional 180° phase shift is added to the gating current supplied to such control electrode.

6. A speed responsive motor starting system in accordance with claim 2 wherein the current sensing means comprises a transformer having a first winding connected in series with the motor run winding and a second winding coupled to the control electrode of the second switching device.

7. A speed responsive motor starting system in accordance with claim 6 wherein the second winding is coupled to the control electrode of the second switching device in an opposite polarity manner relative to the first winding so that an additional 180° phase shift is added to the gating current supplied to such control electrode.

8. A speed responsive motor starting system in accordance with claim 4 wherein the system includes a pair of supply circuit means adapted to be individually connected to different sides of an electrical power source, wherein the motor start mechanism and the first switching device are connected in series between the two supply circuit means, wherein one power electrode of the second switching device is coupled to one of the supply circuit means and the other power electrode of the second switching device is coupled to the control electrode of the first switching device and wherein the capacitor means is connected in series with the power electrodes of the second switching device intermediate the one supply circuit means and the control electrode of the first switching device.

9. A speed responsive motor starting system in accordance with claim 8 wherein the transformer means includes a transformer having a first winding connected in series with the motor run winding and a second winding coupled to the control electrode of the second switching device.

10. A speed responsive motor starting system in accordance with claim 9 wherein the second transformer winding is coupled to the control electrode of the second switching device in an opposite polarity manner relative to the first transformer winding so that an additional 180° phase shift is added to the gating current supplied to the control electrode of the second switching device.

* * * * *